United States Patent
Coughlin et al.

(10) Patent No.: US 9,474,253 B2
(45) Date of Patent: Oct. 25, 2016

(54) HUMMINGBIRD FEEDER

(71) Applicant: Plow & Hearth, LLC, Madison, VA (US)

(72) Inventors: Janice M. Coughlin, Charlottesville, VA (US); Tere Eggleston, Richmond, VA (US)

(73) Assignee: PLOW & HEARTH, LLC, Madison, VA (US)

( * ) Notice: Subject to any disclaimer, the term of this patent is extended or adjusted under 35 U.S.C. 154(b) by 62 days.

(21) Appl. No.: 14/276,322

(22) Filed: May 13, 2014

(65) Prior Publication Data

US 2014/0338605 A1    Nov. 20, 2014

Related U.S. Application Data

(60) Provisional application No. 61/825,221, filed on May 20, 2013.

(51) Int. Cl.
*A01K 7/00* (2006.01)
*A01K 39/02* (2006.01)

(52) U.S. Cl.
CPC .................................. *A01K 39/0206* (2013.01)

(58) Field of Classification Search
CPC .................................................. A01K 39/0206
USPC ............................................................. 119/72
See application file for complete search history.

(56) References Cited

U.S. PATENT DOCUMENTS

| | | | | |
|---|---|---|---|---|
| 3,125,069 A | * | 3/1964 | Fowler | A01K 39/00 119/77 |
| 5,507,249 A | * | 4/1996 | Shaw | A01K 39/0206 119/72 |
| 6,499,430 B2 | * | 12/2002 | Garcia-Lucio | A01K 7/00 119/72 |
| 6,672,249 B2 | * | 1/2004 | Garcia-Lucio | A01K 7/00 119/72 |
| D517,749 S | * | 3/2006 | Jung | D30/124 |
| 7,448,347 B2 | * | 11/2008 | Richmond | A01K 39/012 119/72 |
| D603,567 S | * | 11/2009 | Chen | D30/124 |
| 7,743,732 B2 | * | 6/2010 | Webber | A01K 39/02 119/77 |
| 8,291,861 B2 | * | 10/2012 | Hepp | A01K 39/0113 119/65 |

\* cited by examiner

*Primary Examiner* — Kristen C Hayes
(74) *Attorney, Agent, or Firm* — Goodman Allen Donnelly PLLC; Charles M. Allen, Esq.; Matthew R. Osenga, Esq.

(57) ABSTRACT

A hummingbird feeder that includes a flower petal shaped attractive structure attached to the hollow body of the feeder around a feeding hole and a removable, replaceable, and non-bulky feeding tube designed to be removably placed within the feeding hole.

17 Claims, 8 Drawing Sheets

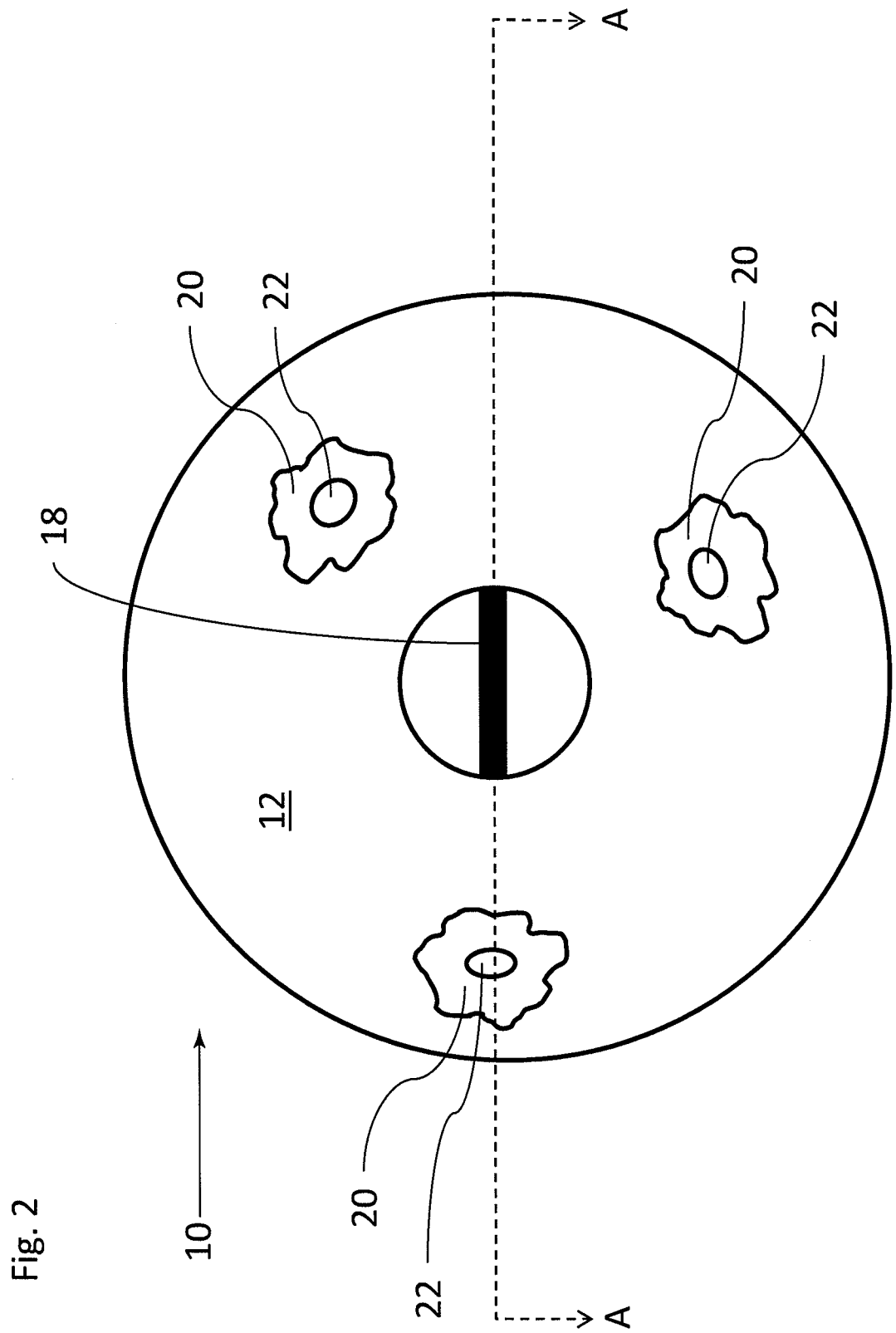

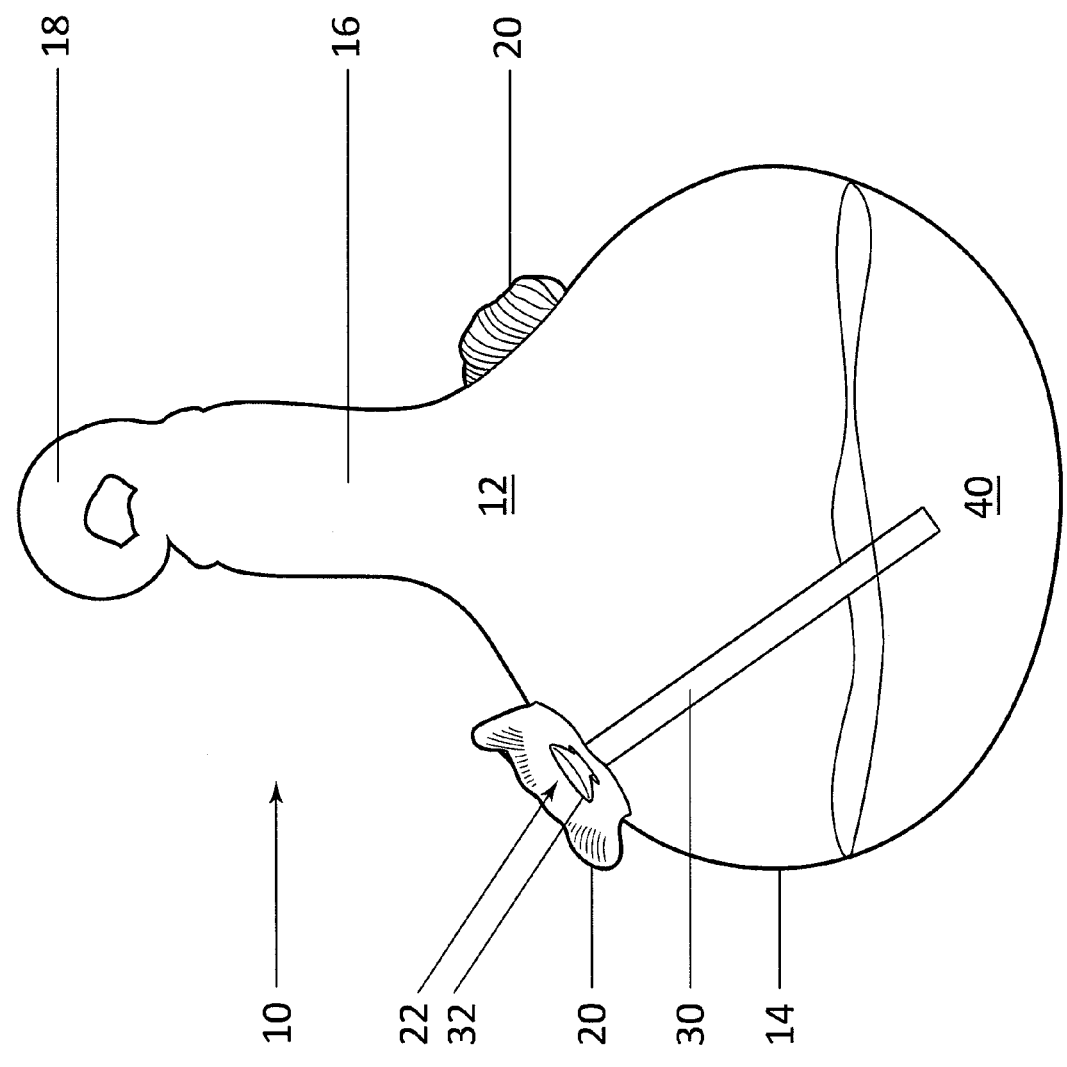

HUMMINGBIRD FEEDER

CROSS-REFERENCE TO RELATED APPLICATION

This application claims the benefit of U.S. Provisional Application No. 61/825,221, filed May 20, 2013, the contents of which are incorporated herein by reference.

FIELD OF THE INVENTION

The field of the invention generally relates to bird feeders. More specifically, the invention relates to an upright hummingbird feeder having an extended replaceable feeding tube.

BACKGROUND OF THE INVENTION

Many homeowners employ various bird and animal feeders to attract fauna. Often, people set up hummingbird feeders in order to attract hummingbirds for observation. Many existing hummingbird feeders use a port located at the bottom of the feeder that allows for liquid food (e.g., nectar) to drip and thereby be accessed by hummingbirds. However, these nectar dripping feeders allow their nectar to drop regardless of whether a hummingbird is feeding. Therefore, most of the nectar may be wasted and continual dripping may attract ants, bees, and other undesired animals. There is a need for a feeder that allows a hummingbird to access the nectar without requiring the nectar to move or drip out of the feeder.

Current hummingbird feeders that allow access to nectar without requiring the nectar to move or drip out of the feeder are difficult to create and contain bulky, fragile, not-easily-replaceable tubes into which the hummingbird places its mouth and tongue in order to feed. These bulky tubes contain integrated structures (i.e., a flower) that make them large and fragile. These bulky tubes must be handled carefully during cleaning or they risk being broken. Additionally, these bulky tubes must be packaged and handled carefully during shipping and transport, thus increasing the overall cost of the initial product and any replacement tubes. U.S. Pat. Nos. 6,672,249 and 6,499,430 both disclose a hummingbird feeder tube having a large, delicate, annular lip in the shape of a flower, having a plurality of petals. The hummingbird feeder tubes disclosed by the '249 and '430 patents can only be used with reservoirs having relatively flat apertures, as the annular lip of the feeding tube contains substantial ornamentation in the shape of the flower petals.

There is a need for a non-drip hummingbird feeder with inexpensive, easily-replaceable feeding tubes.

SUMMARY OF THE INVENTION

The invention relates to various exemplary embodiments, including articles such as bird feeders and the like.

These and other features and advantages of the invention are described below with reference to the accompanying drawings.

BRIEF DESCRIPTION OF THE DRAWINGS

FIG. 2 is an overhead view of the hummingbird feeder as in FIG. 1.

FIG. 3 is a cross-sectional view of the hummingbird feeder taken along line A-A of FIG. 2, with a feeding tube in place.

DETAILED DESCRIPTION

Figure 1:
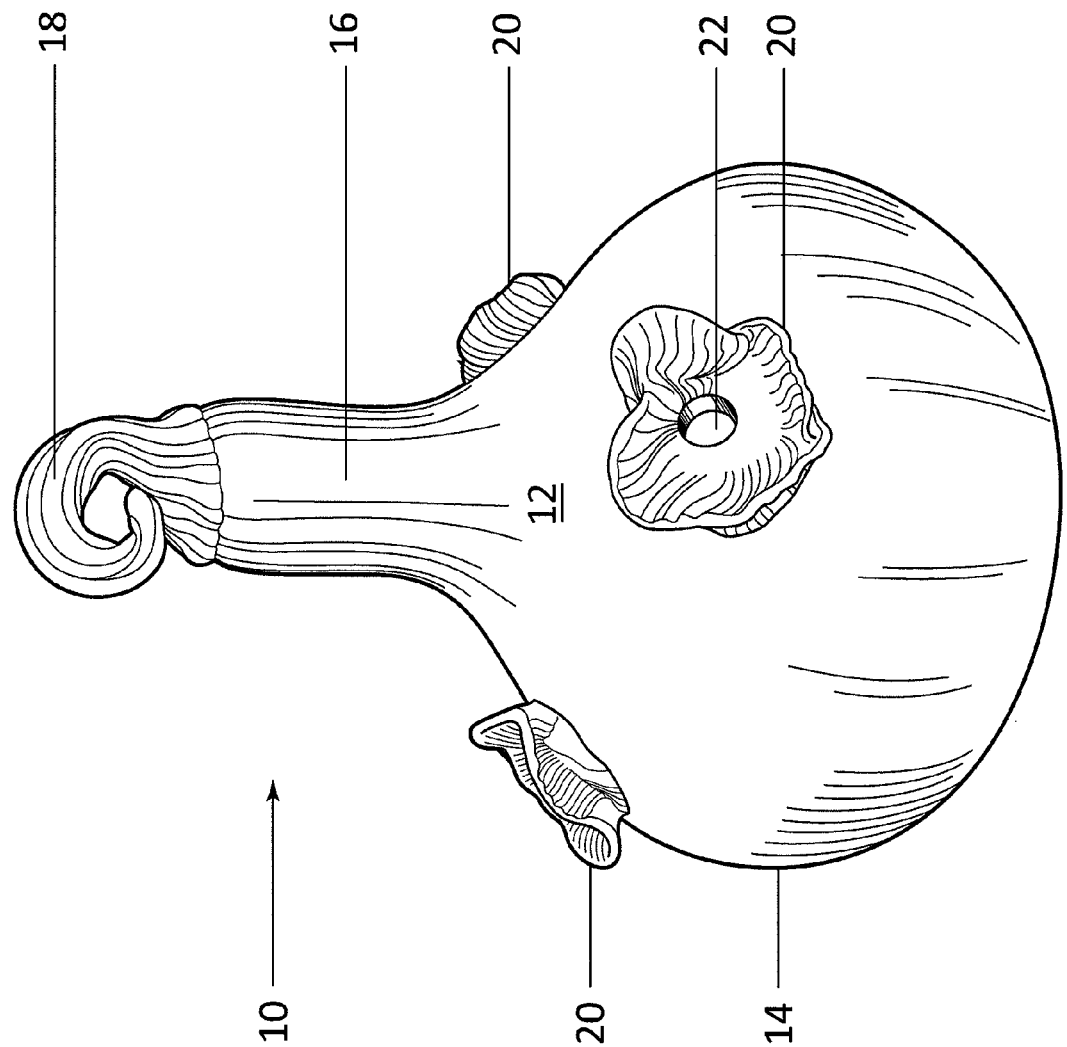
FIG. 1 is a side elevation view of an embodiment of the hummingbird feeder.

The following description is merely exemplary in nature and is not intended to limit the present disclosure, application, or uses. It should be understood that throughout the drawings, corresponding reference numerals indicate like or corresponding parts and features.

Before the present invention is described in further detail, it is to be understood that the invention is not limited to the particular embodiments described, and as such may, of course, vary. It is also to be understood that the terminology used herein is for the purpose of describing particular embodiments only, and is not intended to be limiting, since the scope of the present invention will be limited only by the appended claims.

A number of materials are identified as suitable for various aspects of the hummingbird feeder. These materials are to be treated as exemplary and are not intended to limit the scope of the claims. Although any methods and materials similar or equivalent to those described herein can also be used in the practice or testing of the present invention, a limited number of the exemplary methods and materials are described herein.

It will be understood by those having ordinary skill in the art that the various shapes, openings, and cavities as described herein may be made through any applicable manufacturing technique or combinations of techniques, such as, but not limited to, casting, forging, drawing, turning, welding, cutting, drilling, injecting, reaming, or other techniques, regardless of the terminology used in describing those shapes, openings, apertures, or cavities.

Unless otherwise noted, the drawings of the present application are not necessarily drawn to scale. They demonstrate the basic relationship of the constituent parts, but not necessarily their respective sizes.

It must be noted that as used herein and in the appended claims, the singular forms "a", "an", and "the" include plural referents unless the context clearly dictates otherwise.

The hummingbird feeder disclosed herein allows for bird feeding enthusiasts to attract hummingbirds to their yard and feed them efficiently, without wasting the hummingbird's food. The feeder may have a large capacity and may incorporate an integral hanger. The feeder may have red glass flowers permanently attached to the body of the feeder.

Removable glass feeding tubes may be placed into feeding holes in the center of each glass flower.

The disclosed feeder offers advantages of not having to be refilled as often as other feeders, or to be cleaned and refilled more easily than other feeders due to the ease of removal of the feeding tube. Additionally, the disclosed feeder is easy to clean by removing the glass stems and allowing the hummingbird easy access to the nectar.

The petals that are part of the feeder of the present invention do not detach from the body of the feeder, while the stem comes out for easy cleaning. The stem is where the nectar is going to get sticky and needs to be cleaned thoroughly. Plus the stem can be easily replaced without having to replace the entire flower section.

The feeder 10 disclosed herein is described with regards to feeding hummingbirds. However, it will be appreciated by those having ordinary skill in the art that a feeder 10 as disclosed herein may be used to feed and/or attract other fauna.

Referring to FIG. 1, a hummingbird feeder 10 is shown with a hollow body 12. The body 12 may include a rounded base section 14 and an elongated neck 16. The neck 16 may include a hanging loop 18. The body 12 may contain one or more feeding holes 22. An attractive structure 20 may surround each feeding hole 22. The attractive structure 20 is generally shaped like the petals of a flower, and it is generally made from the same piece of material as the body 12 or is otherwise attached to the body 12. The attractive structure 20 is made to attract the particular fauna to the feeder 10 that is desired, such as a hummingbird.

In an embodiment shown in FIG. 1, the body 12 is made from glass. The attractive structures 20 may be made from glass and may be fused or otherwise attached to the body 12 around each feeding hole 22. Generally, the feeding holes 22 and attractive structures 20 are positioned on a portion of the body 12 that faces somewhat upwards, such that a hummingbird can be facing at least somewhat downwards when feeding. The attractive structures 20 are generally red in color, in order to better attract hummingbirds, but may be other colors to attract other desirable fauna.

In certain embodiments, the feeding holes 22 are the only openings to the inside of the body 12.

FIG. 2 depicts an overhead view of the feeder 10. It is apparent that the feeding holes 22 need not be positioned in any particular relation to one another, but can be located around body 12 as desired.

FIG. 3 depicts a cross-sectional view of the feeder 10 of FIG. 2 taken along line A-A. An attractive structure 20 and feeding hole 22 are shown along the side of the body 12. Additionally, a feeding tube or funnel 30 is shown as being inserted into the feeding hole 22. The feeding tube 30 includes a lip 32. In an embodiment, the feeding tube 30 is made from a material such as glass or plastic and the lip 32 is formed by flaring one end of the feeding tube 30 such that the lip 32 is larger than the feeding hole 22. When inserted into the body 12, the lip 32 of the feeding tube 30 catches on the body 12 or the attractive structure 20 at the feeding hole 22, thus stopping the feeding tube 30 before it can be inserted completely into and through the feeding hole. The lip 32 may further act as a gripping or prying point by which a user can remove the feeding tube 30 from the body 12 without inverting the feeder 10.

When inserted into the body 12, the feeding tube 30 rests partially within a quantity of liquid food 40 previously placed in the feeder 10. The liquid food 40 may be nectar, sugar water, or any other liquid or partially-liquid food designed to attract and/or feed hummingbirds or other fauna.

Figure 4C:
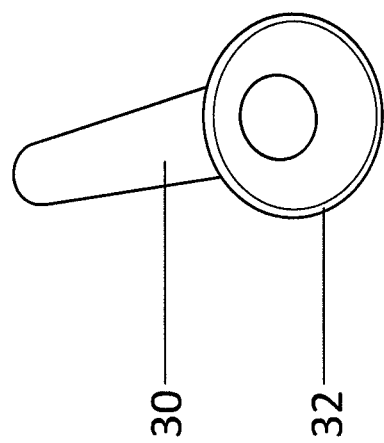
FIG. 4C is an end view of the feeding tube as in FIG. 4A.
Figure 4A:
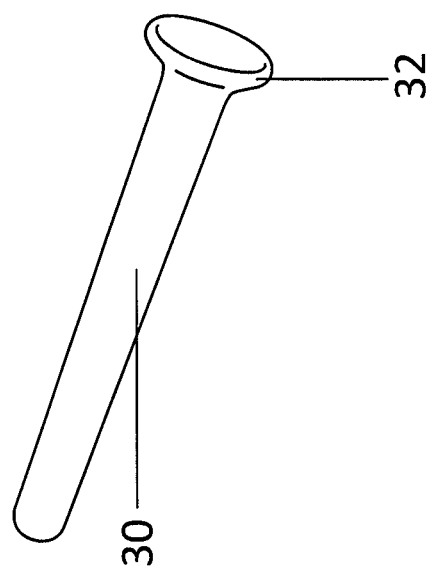
FIG. 4A is a perspective view of an embodiment of a feeding tube as used with the hummingbird feeder of FIG. 1.
Figure 4B:
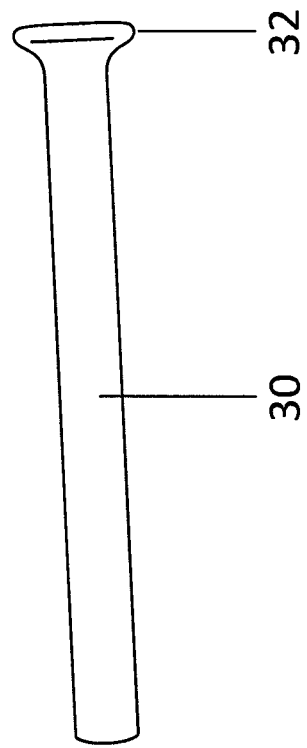
FIG. 4B is a side view of the feeding tube as in FIG. 4A.

Referring to FIGS. 4A-4C, the feeding tube 30 is shown in various orientations. The feeding tube 30 is shown with a flared lip 32.

Figure 5A:
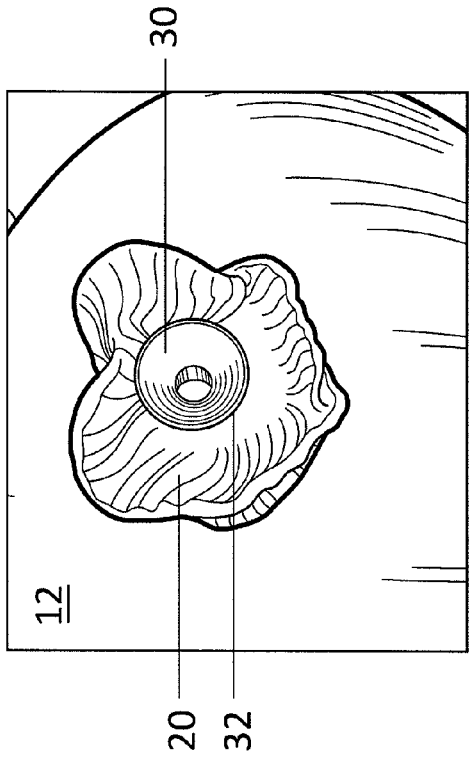
FIG. 5A is a view of a hummingbird attractive structure as used with the hummingbird feeder of FIG. 1.
Figure 5B:
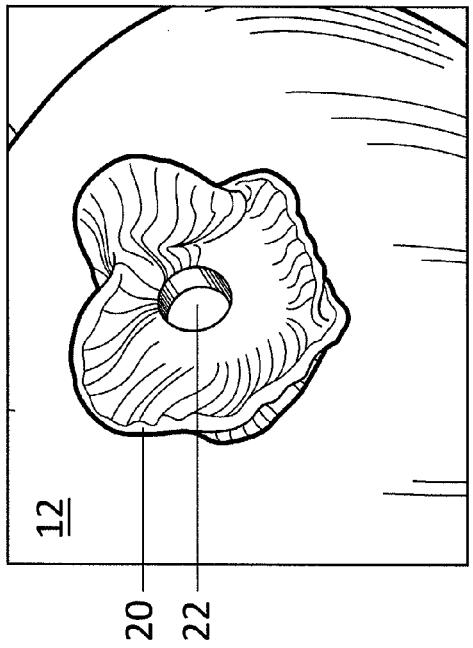
FIG. 5B is a sectional view of the feeder of FIG. 2 taken across line A-A, with no feeding tube in place.
Figure 5C:
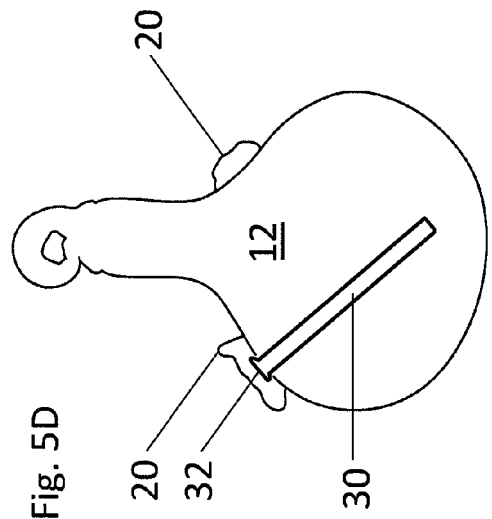
FIG. 5C is a view of a hummingbird attractive structure as used with the hummingbird feeder of FIG. 1.
Figure 5D:
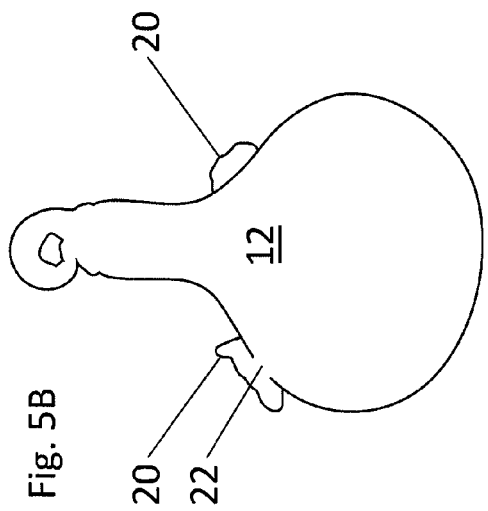
FIG. 5D is a sectional view of the feeder of FIG. 2 taken across line A-A.

FIG. 5A depicts a feeding hole 22 and an attractive structure 20 on a body 12. FIG. 5B is a sectional view of the feeder 10 of FIG. 2 taken across line A-A, showing the attractive structure 20 without a feeding tube installed, as in FIG. 5A. FIG. 5C depicts a feeding tube 30 inserted into a feeding hole 22. FIG. 5D is a sectional view of the feeder 10 of FIG. 2 taken across line A-A, showing the feeding tube 30 within the body 12, as in FIG. 5C.

After being in use for a certain amount of time, the feeding tubes 30 may become damaged or clogged. A user can pull the feeding tube 30 out by its lip 32 and clean the feeding tube before reinserting it in the body 12. If the feeding tube 30 is worn or damaged, a user can simply remove the old feeding tube 30 and replace it with a new one. Due to the simple design and removable nature of the feeding tubes 30 disclosed herein, they remain easy to remove and clean or replace. Because the feeding tubes 30 contain no significant embellishments or ornamentation (e.g., the flower petal-shaped attracting structure 20 that attracts the hummingbird is attached to the body 12, not the feeding tube 30), the feeding tubes 30 can be manufactured at very low cost. Additionally, the simple design of the feeding tubes 30 allow for them to be shipped with very little packaging and supplemental protection, thus lowering the overall shipping weight and volume necessary to supply and re-supply users with replacement feeding tubes 30.

Additionally, it will be noted that when a feeding tube is removed, the body 12 retains its pleasant visual design, complete with the flower petal-shaped attractive structures 20. In certain prior art hummingbird feeders, removal of their bulky feeding tubes renders the feeder unusable as a hummingbird feeder and visually undesirable because the flowers are no longer present and a large hole exists where the bulky feeding tube was removed. In the feeder 10 disclosed herein, the absence of a feeding tube 30 is nearly imperceptible from a distance, and therefore such absence does not negatively affect the aesthetic of the feeder 10. Therefore, if a feeding tube 30 were to accidentally break or become unusable, the instant feeder 10 may retain its pleasant visual design indefinitely or until a replacement feeding tube 30 is obtained.

It will be understood by those having ordinary skill in the art that the shape of the body 12 may differ without departing from the spirit of the invention. It will also be understood by those having ordinary skill in the art that the dimensions of the feeder 10 and its individual parts may be increased or decreased as necessary in order to achieve different shapes, styles, and sizes, without departing from the spirit of the invention.

Figure 6:
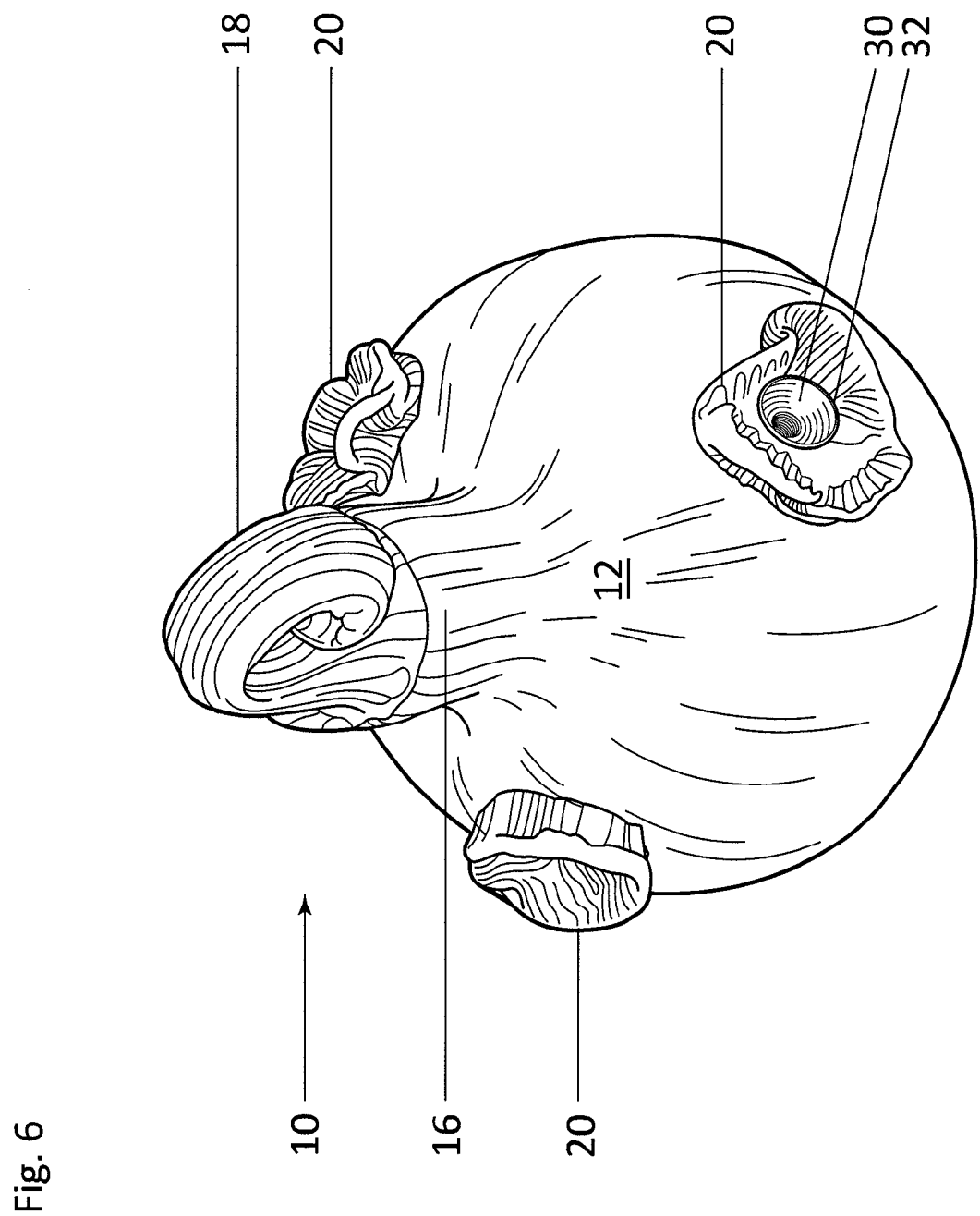
FIG. 6 is an overhead view of the hummingbird feeder as in FIG. 1.
Figure 7:
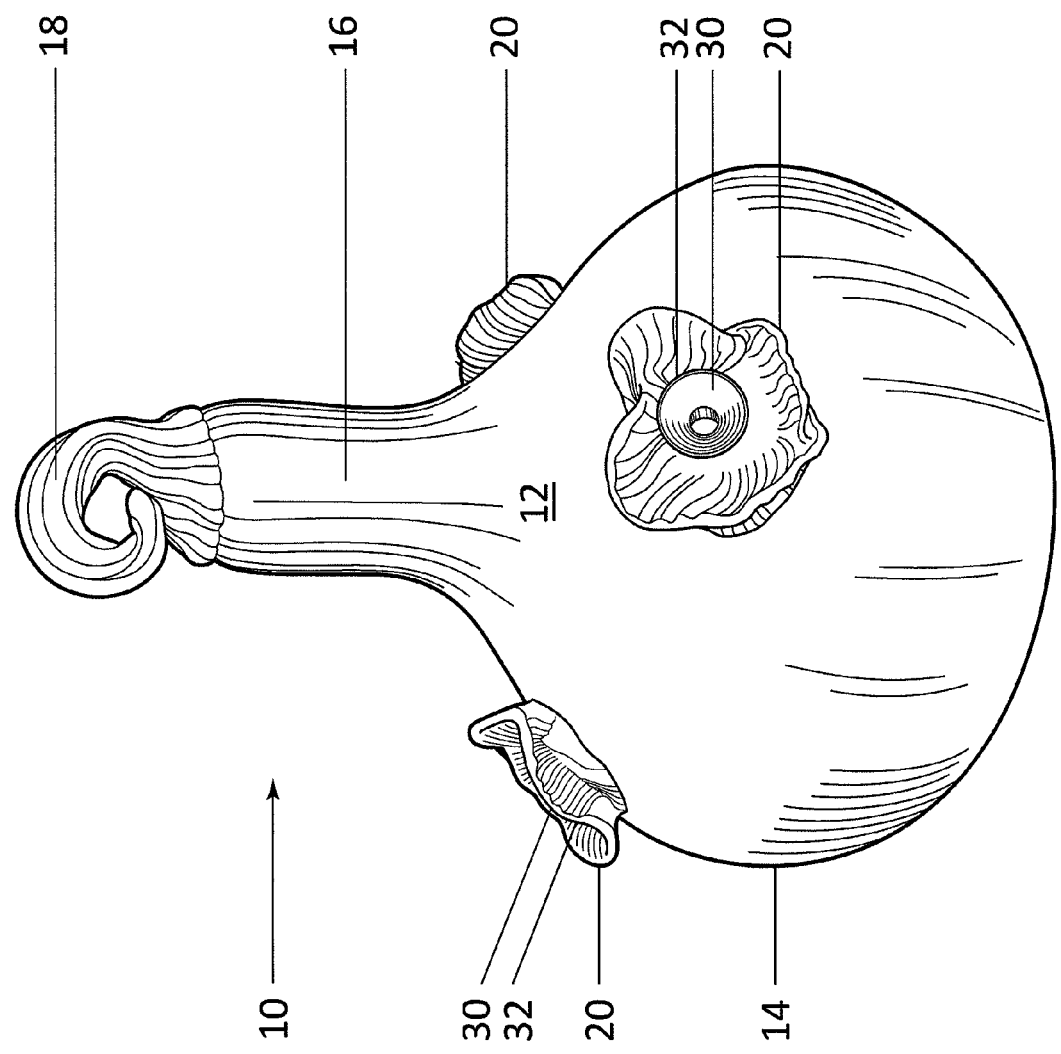
FIG. 7 is a side elevation view of the hummingbird feeder as in FIG. 1.

Referring to FIGS. 6-7, it is apparent that the body 12 may be ornamented with various colors, design, or shapes apart from the attractive structures 20. In the embodiments shown in FIGS. 6-7, the body 12 contains numerous round embellishments, creating an effect known as "hobnail glass." Additionally, it is noted that the feeder 10 may have a relatively flat bottom enabling the feeder 10 to be self-supporting by being placed on a relatively flat surface (e.g., a table). Alternatively, the feeder 10 may include a hanging loop 18, allowing the feeder 10 to hang from a support (e.g., a tree).

Figure 8:
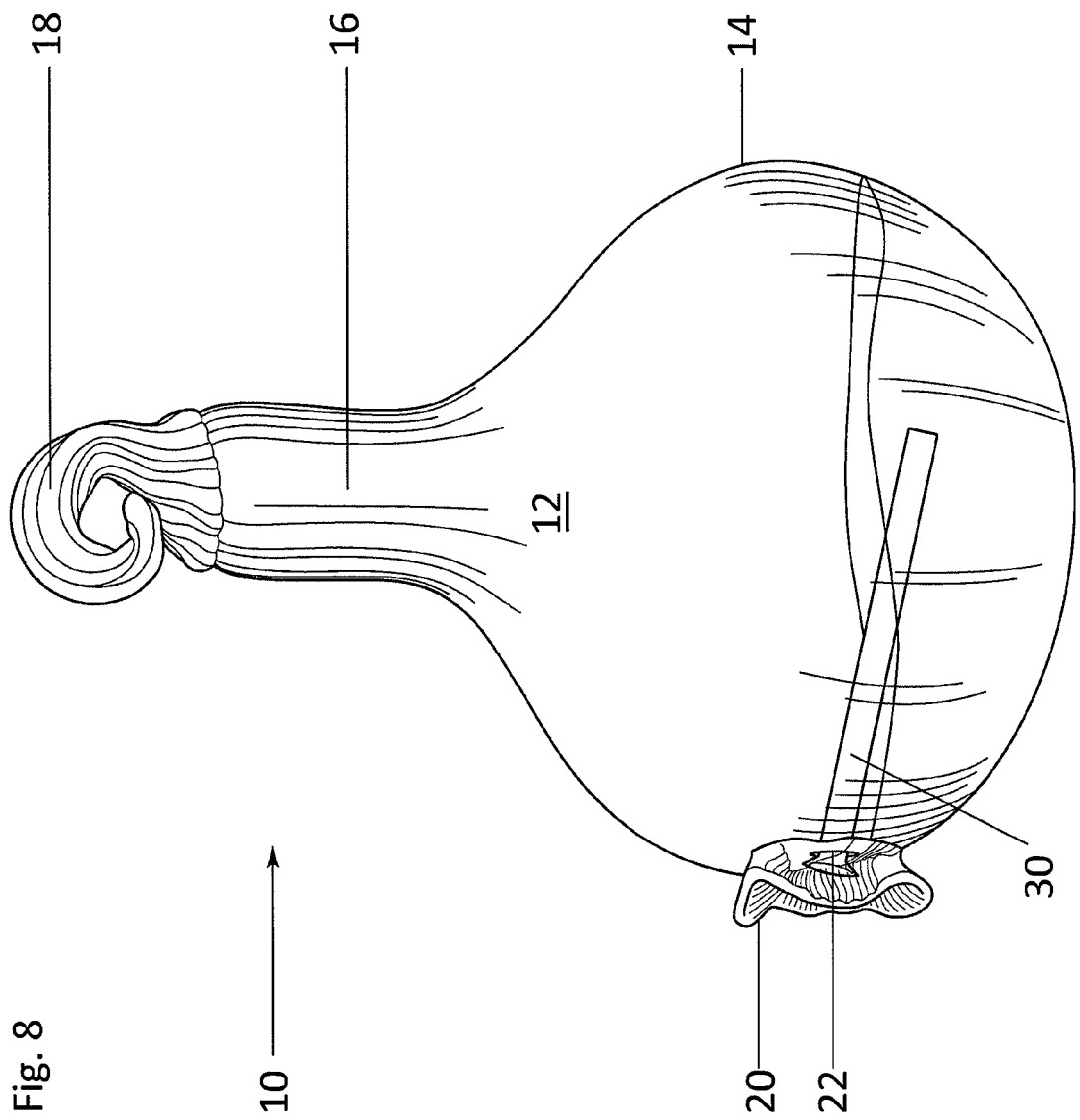
FIG. 8 is a side elevation view of an embodiment of the hummingbird feeder.

FIG. 8 shows an implementation of a hummingbird feeder 10 that is similar to the feeder shown in FIG. 1. The hummingbird feeder 10 includes a body 12 that may have a rounded base section 14 and an elongated neck 16. The neck 16 may include a hanging loop 18. The body 12 may contain one or more feeding holes 22. An attractive structure 20 may surround each feeding hole 22. The attractive structure 20 is generally shaped like the petals of a flower, and it is generally made from the same piece of material as the body 12 or is otherwise attached to the body 12. The attractive structure 20 is made to attract the particular fauna to the feeder 10 that is desired, such as a hummingbird. In this implementation, the feeding holes 22 and attractive structures 20 are positioned on a portion of the body 12 that is somewhat lower than the position shown in FIG. 1. In this case, the attractive structure 20 is nearly horizontal and the feeding holes 22 and feeding tube 30 are angled down only slightly to permit the bird to reach the liquid inside the feeder 10.

While the invention has been described in conjunction with specific exemplary implementations, it is evident to those skilled in the art that many alternatives, modifications, and variations will be apparent in light of the foregoing description. Accordingly, the invention is intended to embrace all such alternatives, modifications, and variations that fall within the scope and spirit of the appended claims.

What is claimed is:

1. A bird feeder comprising:
   a hollow body for holding liquid, the body including at least one feeding hole;
   a structure configured to attract hummingbirds associated with each of the at least one feeding hole and attached to the body; and
   a removable feeding tube that, in use, is of sufficient length to permit access to the liquid from a point exterior to the body,
   the bird feeder being configured such that, when the feeding tube is removed from the body, the structure configured to attract hummingbirds remains attached to the hollow body.

2. The bird feeder of claim 1, wherein the hollow body is formed of glass.

3. The bird feeder of claim 1, wherein the hollow body includes an elongated neck portion and a round base portion.

4. The bird feeder of claim 3, wherein the elongated neck portion includes a loop for hanging the feeder.

5. The bird feeder of claim 1, wherein the structure is shaped like petals of a flower.

6. The bird feeder of claim 1, wherein the removable feeding tube has a diameter less than the diameter of the feeding hole and includes a flared tip at one end having a diameter greater than the diameter of the feeding hole, such that when the feeding tube is inserted into the feeding hole, it does not fall into the hollow body.

7. A hummingbird feeder comprising:
   a hollow body made from glass and containing a feeding hole having a hole diameter, wherein the feeding hole is surrounded by a structure resembling petals of a flower, and permanently attached to the body; and
   a removable feeding tube made of glass and formed as a hollow cylinder with a flared tip having a tip diameter greater than the hole diameter.

8. The hummingbird feeder of claim 7, wherein the hollow body includes an elongated neck portion and a round base portion.

9. The hummingbird feeder of claim 8, wherein the feeding hole and the structure are located on the round base portion of the hollow body.

10. The hummingbird feeder of claim 7, further comprising a plurality of feeding holes, each surrounded by a structure resembling the petals of a flower.

11. A hummingbird feeder comprising:
    a hollow body for holding liquid food, the hollow body having an exterior surface;
    a feeding hole through the exterior surface of the hollow body, the feeding hole having a diameter;
    a structure resembling the petals of a flower affixed to the exterior surface of the hollow body and surrounding the feeding hole; and
    a removable feeding tube for use within the feeding hole that permits access to the liquid food from the exterior of the hollow body, the feeding tube having first and second ends with the first end having a diameter greater than the diameter of the feeding hole and the second end having a diameter less than the diameter of the feeding hole,
    the hummingbird feeder being configured such that, when the feeding tube is removed from the feeding hole, the structure resembling the petals of a flower remains affixed to the exterior surface of the hollow body.

12. The hummingbird feeder of claim 11, wherein the structure resembling the petals of a flower is formed of red glass.

13. The hummingbird feeder of claim 11, wherein the exterior surface of the body resembles hobnail glass.

14. The hummingbird feeder of claim 11, wherein the hollow body includes an elongated neck portion and a round base portion.

15. The hummingbird feeder of claim 14, wherein the elongated neck portion includes a loop for hanging the feeder.

16. The hummingbird feeder of claim 14, wherein the feeding hole and the structure are located on the round base portion of the hollow body.

17. The hummingbird feeder of claim 11, further comprising a plurality of feeding holes, each surrounded by a structure resembling the petals of a flower.

* * * * *